United States Patent
Webster et al.

(10) Patent No.: US 11,068,977 B2
(45) Date of Patent: Jul. 20, 2021

(54) SYSTEM AND METHOD FOR PROVIDING A PAYMENT INSTRUMENT

(71) Applicant: Barclays Bank PLC, London (GB)

(72) Inventors: Lucinda Webster, London (GB); Peter Guy, Northampton (GB)

(73) Assignee: Barclays Execution Services Limited, London (GB)

( * ) Notice: Subject to any disclaimer, the term of this patent is extended or adjusted under 35 U.S.C. 154(b) by 369 days.

(21) Appl. No.: 13/668,691

(22) Filed: Nov. 5, 2012

(65) Prior Publication Data
US 2013/0144776 A1    Jun. 6, 2013

(30) Foreign Application Priority Data

Dec. 1, 2011 (GB) .................................. 1120699

(51) Int. Cl.
*G06Q 40/02* (2012.01)
*G06Q 20/42* (2012.01)

(52) U.S. Cl.
CPC ......... *G06Q 40/025* (2013.01); *G06Q 20/425* (2013.01)

(58) Field of Classification Search
CPC .............................. G06Q 40/025; G06Q 40/02
USPC .......................................................... 705/38
See application file for complete search history.

(56) References Cited

U.S. PATENT DOCUMENTS

| | | | |
|---|---|---|---|
| 6,352,206 B1 * | 3/2002 | Ashley | G06K 13/07 235/475 |
| 7,658,324 B2 | 2/2010 | Gindele | |
| 8,352,370 B1 * | 1/2013 | White et al. | 705/44 |
| 8,751,317 B2 * | 6/2014 | Qawami | G06Q 20/20 705/21 |
| 2002/0138418 A1 * | 9/2002 | Zarin | G06Q 20/10 705/38 |
| 2004/0223476 A1 * | 11/2004 | Jose | H04W 72/1257 370/338 |
| 2005/0097036 A1 * | 5/2005 | White et al. | 705/39 |
| 2006/0186195 A1 | 8/2006 | O'Neal | |

(Continued)

FOREIGN PATENT DOCUMENTS

| | | |
|---|---|---|
| EP | 1-463-011 | 9/2004 |
| EP | 1463011 | 9/2004 |

(Continued)

OTHER PUBLICATIONS

Hany et al., SecureSMSpay: Secure SMS Mobile Payment model 20-23, in 2008 2nd International Conference on Anti-counterfeiting, Security and Identification, 2008 (Year: 2008).*

*Primary Examiner* — Elizabeth H Rosen
*Assistant Examiner* — Kevin T Poe
(74) *Attorney, Agent, or Firm* — Foley & Lardner LLP

(57) ABSTRACT

A system and method for processing an online application for a payment instrument is described, in which user details are received, a payment instrument is assigned based on the received user details, wherein the payment instrument is associated with unique identifying data, and the user is informed of the assigned payment instrument by transmitting a first portion of said unique identifying data via a first communication channel, and transmitting a second portion of said unique identifying data via a second communication channel different to the first communication channel.

20 Claims, 3 Drawing Sheets

(56) References Cited

U.S. PATENT DOCUMENTS

| | | | |
|---|---|---|---|
| 2006/0277147 A1* | 12/2006 | McCoy | G06Q 20/02 |
| | | | 705/40 |
| 2008/0109358 A1* | 5/2008 | Kottmeier et al. | 705/44 |
| 2008/0268811 A1* | 10/2008 | Beenau et al. | 455/406 |
| 2009/0076966 A1* | 3/2009 | Bishop | G06Q 20/027 |
| | | | 705/67 |
| 2009/0171845 A1* | 7/2009 | Powell | G06Q 20/32 |
| | | | 705/44 |
| 2010/0017334 A1 | 1/2010 | Itoi et al. | |
| 2010/0023531 A1* | 1/2010 | Brisebois et al. | 707/10 |
| 2010/0076891 A1* | 3/2010 | Vanmoor | 705/44 |
| 2010/0217708 A1* | 8/2010 | Vanmoor | 705/44 |
| 2011/0251954 A1* | 10/2011 | Chin | 705/40 |
| 2012/0116902 A1* | 5/2012 | Cardina | G06Q 20/10 |
| | | | 705/17 |
| 2012/0124656 A1* | 5/2012 | Senac | H04L 9/3213 |
| | | | 726/9 |
| 2012/0254004 A1* | 10/2012 | Cleary et al. | 705/35 |
| 2013/0103581 A1* | 4/2013 | Barry et al. | 705/42 |
| 2013/0144663 A1* | 6/2013 | Qawami | G06Q 10/02 |
| | | | 705/5 |

FOREIGN PATENT DOCUMENTS

| | | | |
|---|---|---|---|
| EP | 1 821 249 A1 | 8/2007 | |
| GB | 2446179 A * | 8/2008 | G06Q 20/10 |
| JP | 2007-041957 | 2/2007 | |

* cited by examiner

SYSTEM AND METHOD FOR PROVIDING A PAYMENT INSTRUMENT

FIELD OF THE INVENTION

This invention relates to a financial payment system, and more particularly to a system for providing a payment instrument in real-time.

BACKGROUND OF THE INVENTION

Online merchant systems are generally known, in which customers can browse and purchase items and services from the merchant online store through a web browser or other form of online application.

Typically, when shopping at a merchant online store, a customer may apply for a merchant sponsored payment card that may be used to purchase goods and/or services from the merchant. For example, when checking out, the customer may be prompted to apply for a payment card sponsored by the merchant. A payment card provider associated with the retail merchant may receive personal information provided by the consumer to determine whether he or she has suitable credit to warrant approval for the payment card and the associated line of credit. Upon verification that the customer has suitable credit, the payment card provider may automatically approve the payment card, assign a payment card account number the payment card assigned to the customer, and an assign an expiration date of the payment card to the customer. As a result, the approval and processing procedure is complete and the payment card is available for instant use.

Examples of such known systems are MBNA's Shopsafe, which creates a one-time card number linked to an existing card account so as to shield the card account details from the merchant, and Amazon's Instant Rewards card, which offers instant (60 second) approval and instant use after approval.

EP Patent No. 1821249 to Orbiscom discusses another system for issuing one-time card numbers.

U.S. Pat. No. 7,658,324 to Barclays Bank Delaware discusses a system for providing a temporary payment instrument having a barcode with an encrypted account number and expiration date assigned to a consumer.

However, and considering such systems as those discussed above, the merchant sponsored payment card is automatically approved and authorized for use to settle payment transactions solely with a specific merchant.

What is desired, therefore, is a more efficient, flexible and secure system for providing a payment instrument in real-time.

STATEMENTS OF THE INVENTION

According to one aspect of the present invention, a system for secure transmission of data identifying a payment instrument is provided. The system includes means for transmitting a first portion of the identifying data via a first communication channel, and means for transmitting a second portion of the identifying data via a second communication channel different from the first communication channel.

In another aspect, the present invention provides a system for processing an online application for a payment instrument. The system includes means for details. The system also includes means for assigning a payment instrument based on the received user details, wherein the payment instrument is associated with unique identifying data. The system also includes means for informing a user of the assigned payment instrument by transmitting a first portion of the unique identifying data via a first communication channel, and transmitting a second portion of the unique identifying data via a second communication channel different from the first communication channel.

In yet another aspect, there is provided a computer program arranged to configure a computer system for operation of the system described above.

In other aspects, there is provided a method of operating a payment instrument system as described above. In another aspect, there is provided a computer program arranged to carry out the method when executed by suitable programmable devices.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

Technical Architecture

Figure 1:
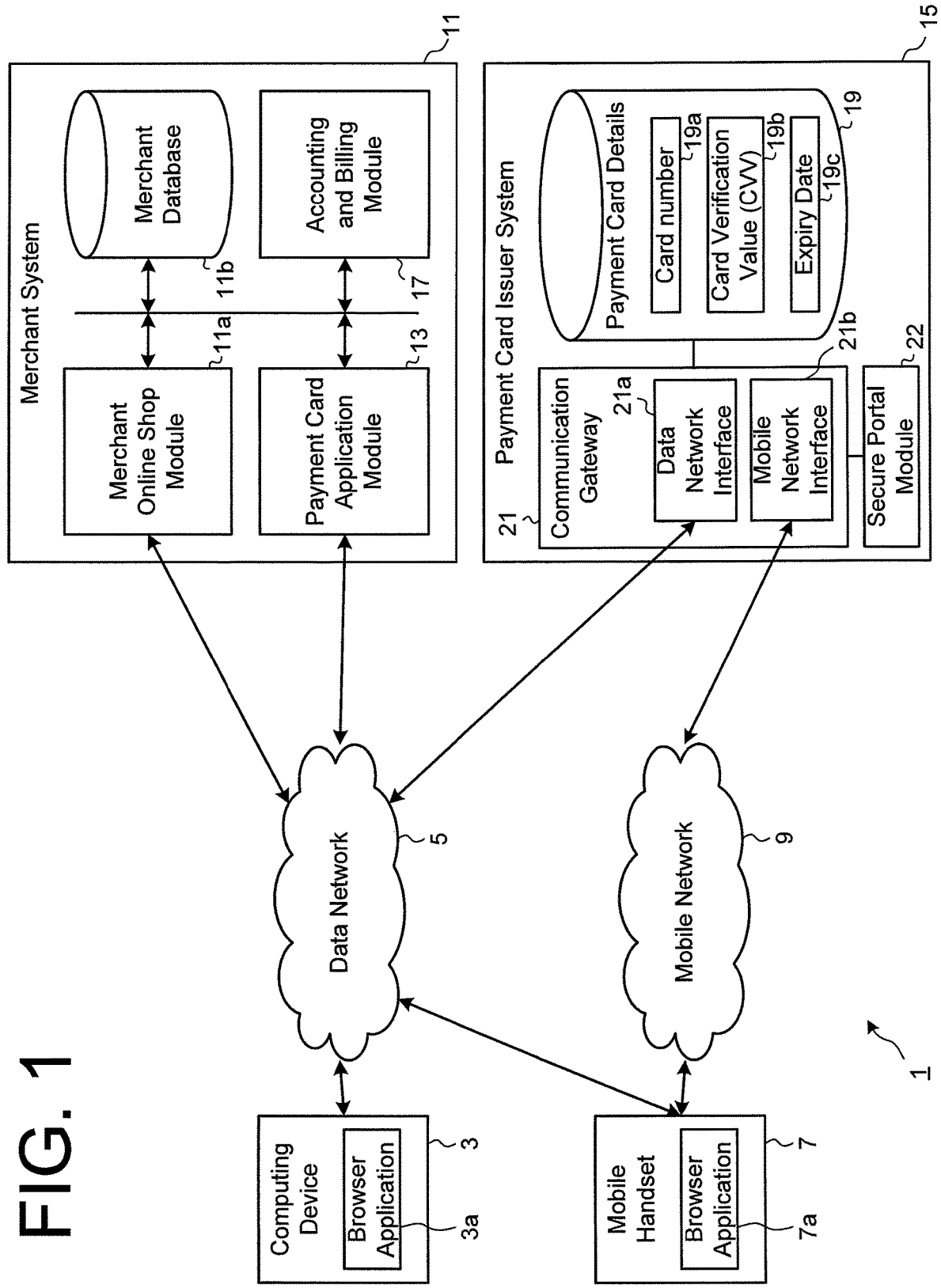
FIG. 1 is a block diagram showing the main components of a payment instrument provisioning system according to an embodiment of the invention.

Referring to FIG. 1, a payment instrument provisioning system 1 according to an embodiment of the present invention comprises a computing device 3 communicating over a data network 5 with a merchant system 11 and a payment card issuer system 15. The payment instrument provisioning system 1 also includes a mobile handset 7 communicating over a separate mobile (or cellular) network 9 with the merchant system 11 and the payment card issuer system 15. The data network 5 may be any suitable data communication network such as a wireless network, a local- or wide-area network including a corporate intranet or the Internet, for example. The mobile network 9 may be any suitable mobile (or cellular) communication network such as General Packet Radio Service (GPRS), Enhanced Data rates for GSM Evolution (EDGE) or 3G ($3^{rd}$ generation mobile telecommunications technology).

It is will appreciated in accordance with a preferred embodiment that the computing device 3 is a personal computer, a laptop, a computing terminal or the like, running a web browser application 3a, for example. The mobile handset 7 is of a type that is well known to those skilled in the art, for example, the mobile handset 7 is a smartphone of a type that is known per se, such as an iPhone™, Blackberry™ or Android™ smartphone, running a mobile web browser application 7a for example, and can be used instead of separate computing device 3 and mobile handset 7. The computing device 3, using the graphical user interface of the web browser application 3a, communicates with merchant system 11 via the data network 5 using, for example, the TCP/IP protocol. Such communication protocols are of a type that are known per se to those skilled in the art of data networks and need not be described further.

The merchant system 11 includes a merchant online shop module 11a and a merchant database 11b that provide a merchant website for display by the computing device 3, for example through the web browser application 3a or any other suitable application. An accounting and billing module 17 is also provided by the merchant system 11. The accounting and billing module 17 handles the associated payment transactions from sender to recipient funding accounts. Such online merchant systems, that is, retailer web sites hosted on a web server, are well known per se to those skilled in the art and need not be described further.

In this embodiment, the merchant system 11 also manages a payment card application module 13 providing an online application for a payment card for display by the computing device 3. In accordance with a preferred embodiment, the online application is an online application interface comprising data defining user input screens for display by the graphical user interface of the web browser application 3a of the computing device 3. The payment card application module 13 is facilitated by the associated payment card issuer system 15. The payment card application module 13 processes user input received from the computing device 3 as the user, that is, the customer, is completing the online application, determines whether the user is eligible for a new payment card based on the received user input and predetermined rules & criteria, approves the issuance of a new payment card, and notifies the payment card issuer system 15 accordingly via the data network 5.

The merchant online shop module 11a, merchant database 11b, payment card application module 13 and accounting and billing module 17 are in operative communication with each other via, for example, a bus or any other subsystem that is employed in the transfer of data between components and modules in the merchant system 11.

The payment card issuer system 15 manages a payment card details database 19 securely storing data of all payment cards that have been issued by the present payment instrument provisioning system 1. In one embodiment, the payment card details for a payment card include a payment card number 19a and an expiration date 19c. The payment card number is typically a sixteen digit card number as is commonly employed in the art, although any form of card number can be used. The card details also include a three digit Card Verification Value (CVV) 19b that is generated based on the card number 19a and the expiration date 19c, using a secure algorithm as is also known per se by those skilled in the art. It will be appreciated that these particular components of the payment card details are provided as an exemplary embodiment and the payment card details can include one or more identifying elements of other suitable forms.

The payment card issuer system 15 communicates with the computing device 3 and the mobile handset 7 using a communication gateway 21. A secure portal module 22, such as a secure web site, can be hosted by the payment card issuer system 15 to provide an online interface for customers to access details associated with their payment card, such as transaction history, usage configuration settings and the like. The communication gateway 21 communicates with the computing device 3 using a data network interface 21a over the data network 5 via a communication protocol such as TCP/IP. The communication gateway 21 is also able to send messages to the mobile handset 7 via the mobile network interface 21b using the mobile network 9, for example, the communication gateway 21 may send short messages to the mobile handset 7 using for example the Short Message Service (SMS) through the mobile network interface 21b. The communication gateway 21 also communicates with other common components of the payment card issuer system 15 for sending payments from sender to recipient accounts. These common components such as accounting systems and payments gateway (not shown) are of a type that is known per se to those skilled in the art of payment transaction systems, and need not be described further.

Payment Card Provisioning

An example of a process of providing a new payment card to a customer in accordance with the present invention will now be described, to illustrate the technical advantage of the payment card provisioning system described above.

Figure 2:
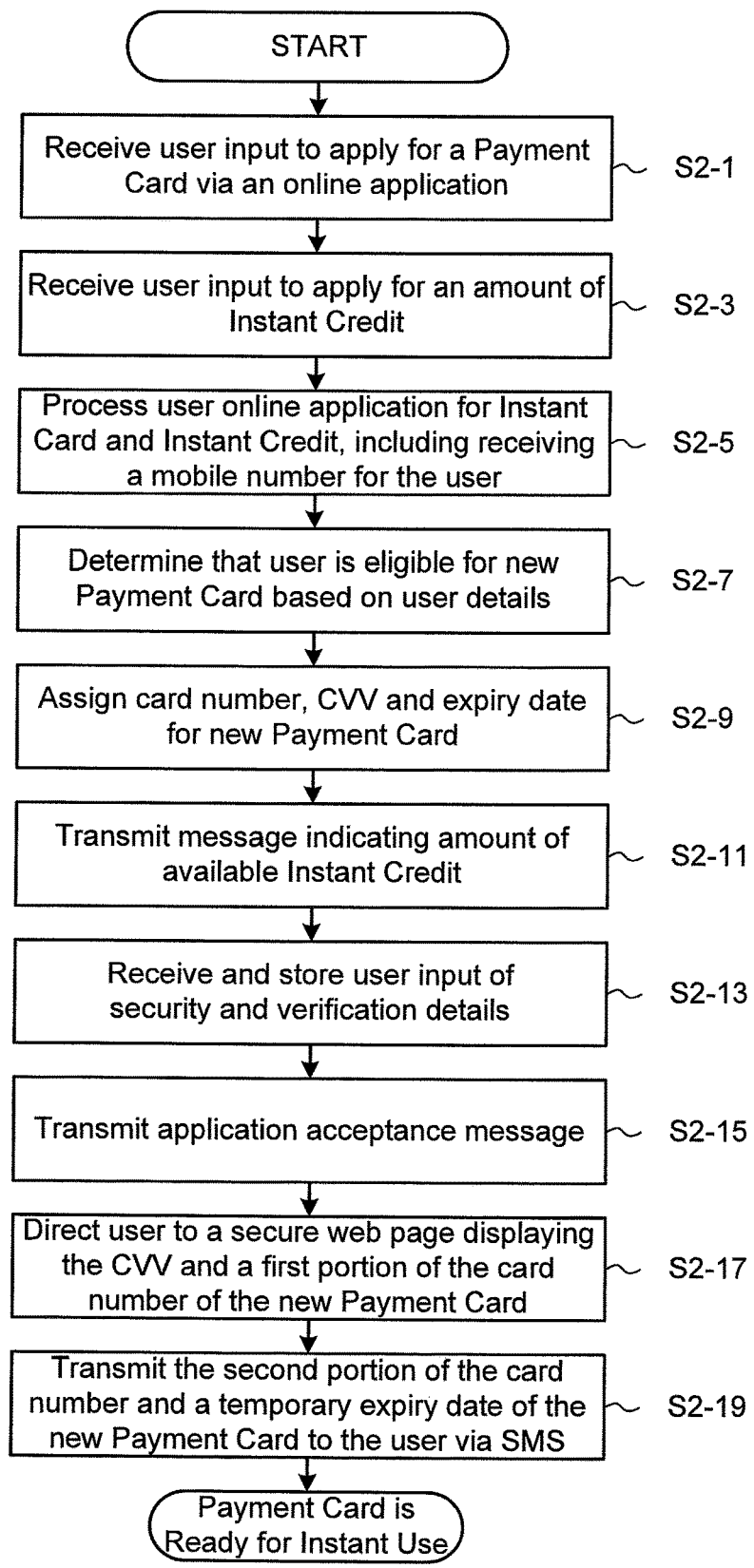
FIG. 2 is a flow diagram illustrating the main processing steps performed by the system of FIG. 1 according to an embodiment of the present invention.

FIG. 2 shows a flow diagram of the present process of processing an online application for a new payment card and providing details of an approved and assigned payment card in a secure and efficient manner. For example, a customer at a merchant retailer online web site is prompted to apply for an instant payment card by clicking on a banner advertisement at the check-out stage of the online purchase transaction. In response to the customer providing user input to start the payment card online application process, the merchant online shop module 11a passes control to the payment card application module 13 to provide data to the computing device 3 of the customer associated with the online application for a payment card. The online application can be an online web-based form of a type that is known to those skilled in the art and need not be described further.

The process begins at S2-1 where the payment card application module 13 receives user input to apply for a payment card via the online application. The online application prompts, via the graphical user interface of the web browser application 3a running on the computing device 3, the customer to input his or her mobile number, as well as other personal information such as legal name, home address, date of birth, and/or the like, that is, the user input user details defining data associated with the user. The user input information is transmitted back to payment card application module 13.

After the customer has completed the payment card online application form as per the pre-defined application journey, he or she is prompted via the graphical user interface of the web browser application 3a running on the computing device 3 as to whether they wish to use the instant credit service associated with payment card for which the customer is applying. For example, the customer can select 'Yes' and be prompted with a list of various pre-determined amounts from which to select an amount of Instant Credit they would like before their physical card is issued and received by post. On the other hand, if the customer selects 'No', then the process continues through a payment card application process along a typical known manner. Assuming the customer wishes to use the instant credit service associated with the payment card for which the customer is applying, the customer selects 'Yes" on the graphical user interface of the web browser application 3a running on the computer 3, and user input to apply for an amount of instant credit is transmitted to and received by the payment card application module 13 at step S2-3.

At step S2-5, the payment card application module 13 processes the customer's online application for a new payment card and instant credit based on the received user input. Various mechanisms are known to those skilled in the art for assessing and determining if a customer is eligible for a credit and/or a payment card, and need not be described further. It will be appreciated that the payment card application module 13 can assign a lower credit limit than the requested amount in the online application, based on a determined credit risk. Upon determining that the customer is eligible for a new payment card at step S2-7, the payment card application module 13 generates or assigns a payment card number, CVV and an expiration date for the new payment card at step S2-9. It is appreciated the expiration date for the new payment card can be a temporary expiration date to control a predetermined amount of time that the new payment card can be used in transactions where the cardholder is not present, until the physical plastic card is received by the customer with a new, typically longer, validity period. The payment card application module 13 communicates with the payment card issuer system 15 to generate or assign the new payment card details, for example based on a list of available card numbers. The payment card application module 13 transmits a notification to the payment card issuer system 15 of the approved and issued payment card. The assigned payment card number 19*a*, CVV 19*b* and expiration date 19*c* for the new payment card can be stored by the payment card issuer system 15 in the payment card details database 19.

At step S2-11, the payment card application module 13 informs the customer, via the graphical user interface of the web browser application 3*a* running on the computing device 3, of the amount of Instant Credit that is available to them using the new issued payment card. At step S2-13, the payment card application module 13 prompts the user via the graphical user interface of the web browser application 3*a* running on the computing device 3 to input answers to a number of predetermined security questions and to provide security details in order to access the new service via the payment card issuer system 15. The user input of security and identification verification details are received and stored by the payment card application module 13 at step S2-13. Upon successfully answering a predetermined number of security questions (i.e. "Who do you bank with?"), the customer receives at step S2-13 a message via the graphical user interface of the web browser application 3*a* running on the computing device 3 indicating that their application for a new payment card and instance credit has been accepted.

At step S2-19, the customer is directed via the graphical user interface of the web browser application 3*a* running on the computing device 3 to a unique web page hosted by the secure portal module 22 of the payment card issuer, where the customer is able to access the CVV and one part of the card number of the newly assigned payment card at step S2-17. The rest of the card number and a temporary expiration date is sent via SMS (via the mobile network 9) to the mobile handset 7 using the mobile number supplied in the online application form at step S2-19. The missing digits within the transmitted card number can be identified by a character such as a star/asterisk or "x" in both channels, so that the customer will find it logical and easy to re-assemble the card number as transmitted over both channels. The customer receives the SMS on the mobile device 7 and is directed into the web site of the secure portal module 22 simultaneously.

In this way, the customer has efficiently applied for a new payment card and is securely provided with the newly assigned payment card details by way of separate communication channels. The customer is thereby able to make or complete a "cardholder not present" and/or "card not present" type of payment transaction at any merchant or retailer using the new payment card instantly after approval and receipt of the payment card details, without having to wait for a physical card to be issued and received. Moreover, the issued payment card number can be in the 16 digit form that is commonly accepted by present payment card systems, because the payment card issuer is assured that the assigned payment card details will be securely and efficiently transmitted to the customer who applied for the payment card.

Computer Systems

Figure 3:
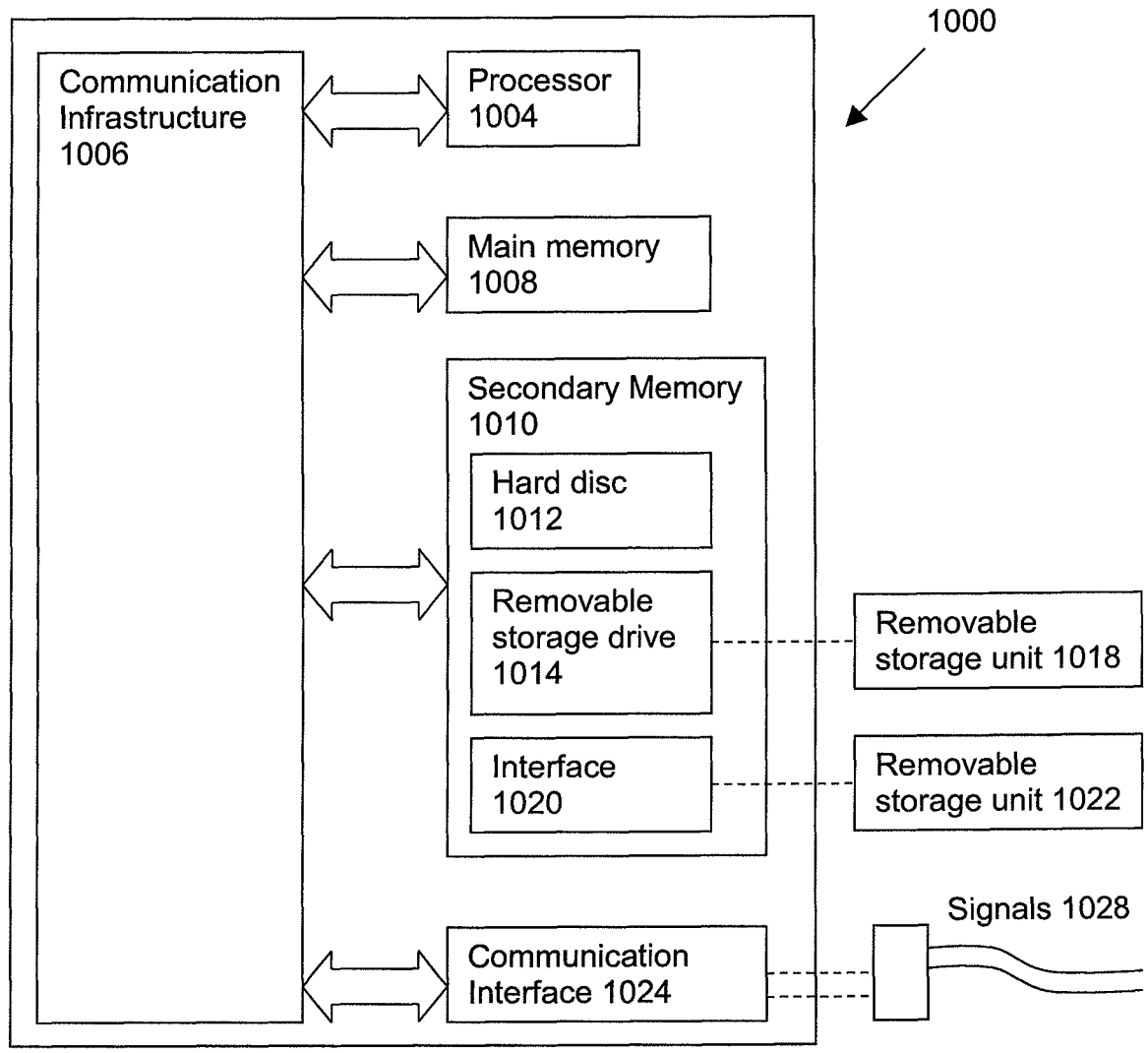
FIG. 3 is a diagram of an example of a computer system on which one or more of the functions of the embodiment may be implemented.

The entities described herein, such as the merchant system, the payment card issuer system and their respective constituent modules and components, are preferably implemented by computer systems such as computer system 1000 as shown in FIG. 3. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and also includes a secondary memory 610. Secondary memory 1010 includes, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 includes other similar means for allowing computer programs or other instructions to be loaded into computer system 1000. Such means may include, for example, a removable storage unit 1022 and an interface 1020. Examples of such means includes a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 also includes a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fiber optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

It will be understood that embodiments of the present invention are described herein by way of example only, and that various changes and modifications may be made without departing from the scope of the invention.

For example, in the embodiment described above, the computing device and the mobile handset are provided as separate devices, and the customer uses the computing device to apply for an instant payment card and receives one part of the card details for the approved payment card at the computing device via the data network, and receives the remaining part of the card details for the approved payment card at the mobile handset device via the mobile network. It will be appreciated that in an alternative embodiment, a single device such as a mobile handset of a smartphone type can be used to receive the first part of the card details for the approved payment card via the data network and to receive the second part of the card details via the mobile network.

In the embodiment described above, the payment card online application module is provided by the payment card issuer system and managed by the merchant system. As those skilled in the art will appreciate, the payment card issuer system may instead host and manage the payment card online application module, and communicate with the merchant system to handle requests for new payment cards.

It will also be appreciated that some of the process steps described in the embodiment above may proceed in various orders and that the particular order shown in FIG. 2 is for illustrative purposes according to one exemplary embodiment of said steps. For example, the online application may instead include prompts for user input of security and verification details, and the payment card application module may therefore be configured to receive and store user input of such details prior to determining that the user is eligible for a new payment card.

As a further modification, the payment card application module may instead be configured to pass the received user details to the payment card issuer system, and the payment card issuer system can instead determine whether the user is eligible for a new payment card and subsequently assign and store the card details for the new payment card.

In the embodiment described above, the mobile device stores a plurality of application modules (also referred to as computer programs or software) in memory, which when executed; enable the mobile device to implement embodiments of the present invention as discussed herein. As those skilled in the art will appreciate, the software may be stored in a computer program product and loaded into the mobile device using any known instrument, such as removable storage disk or drive, hard disk drive, or communication interface, to provide some examples.

Alternative embodiments may be envisaged, which nevertheless fall within the scope of the following claims.

The invention claimed is:

1. A computer system comprising:
a data network interface coupled to a first channel;
a mobile network interface coupled to a second channel different from the first channel; and
a processor coupled to both the data network interface and the mobile network interface, the processor having programmed instructions that:
generate an identifier uniquely associated with a user of a mobile handset,
provide Internet content comprising a first portion of the identifier and a user interface input element, the Internet content uniquely associated with the user of the mobile handset,
receive, via the first channel from a web browser application executing on the mobile handset, a request for the Internet content,
transmit, via the first channel to the mobile handset responsive to the request for the Internet content, the Internet content comprising the first portion of the identifier and the user interface input element,
receive, via the first channel from the mobile handset, an address of the mobile handset input into the user interface input element, and
transmit, via the second channel to the mobile handset, the second portion of the identifier uniquely associated with the user of the mobile handset, the second portion transmitted as one or more Short Message Service (SMS) messages, the mobile handset providing the first portion and second portion concatenated to recover the identifier uniquely associated with the user of the mobile handset to a second computer system.

2. The system of claim 1, wherein the identifier comprises a card number, a card verification value and a card expiry date associated with a financial credit account.

3. The system of claim 2, wherein the first portion of said identifier comprises a first portion of the card number and the card verification value, and wherein the second portion of the identifier comprises a second portion of the card number and the card expiry date.

4. The system of claim 3, wherein the processor determines whether a user is eligible to be assigned a new payment instrument.

5. The system of claim 4, wherein the processor that determines whether a user is eligible to be assigned the new payment instrument operates to assign a temporary card verification value and a temporary card expiry date after the processor that determines whether a user is eligible to be assigned the new payment instrument determines that the user is eligible, and wherein the processor that communicates with the mobile handset transmits to the mobile handset the temporary card verification value and the temporary card expiry date.

6. The system of claim 5, wherein the processor further includes programmed instructions to assign a replacement card verification value and a replacement card expiration date for the payment card.

7. The system of claim 1, wherein the system is hosted on a merchant server to provide an online application for a financial credit account with a financial institution.

8. The system of claim 1, wherein the received user details are received through an online application interface.

9. The system of claim 8, wherein the online application interface comprises data defining user input screens for display by a computing device.

10. The system of claim 1, wherein the processor is configured to issue the assigned new payment instrument to a user of a mobile handset in response to receiving details associated with an online application by the user for the new payment instrument, the details including a mobile number of a mobile handset associated with the user, and wherein the second portion of said identifier is transmitted as one or more SMS messages to said mobile number.

11. A computer-implemented method, comprising:
receiving data defining details, by a computer device, associated with a user, including a mobile number of a mobile handset associated with said user;
generating an identifier uniquely associated with the user of the mobile handset;
providing Internet content comprising a first portion of the identifier and a user interface input element, the Internet content uniquely associated with the user of the mobile handset;
receive, via a first channel from a web browser application executing on the mobile handset, a request for the Internet content;
transmitting via a data network interface coupled to the first channel to said mobile handset a first portion of the identifier and the user interface input element; and
transmitting via a mobile network interface coupled to a second channel, a second portion of the identifier uniquely associated with the user of the mobile handset to said mobile handset as one or more Short Message Service (SMS) messages, wherein the second channel is different from the first channel and wherein the second portion of the identifier is different from the first portion of identifier, the mobile handset providing the first portion and second portion concatenated to recover the identifier uniquely associated with the user of the mobile handset to a second computer system.

12. The method of claim 11, wherein the identifier comprises a card number, a card verification value and a card expiration date associated with a financial credit account.

13. The method of claim 11, wherein the first portion of the identifier comprises a first portion of the card number and the card verification value, and wherein the second portion of the identifier comprises a second portion of the card number and the card expiry date.

14. The method of claim 13, further comprising determining that a user is eligible to be assigned the new payment instrument.

15. The method of claim 14, wherein assigning the new payment instrument comprises assigning a temporary card verification value and a temporary card expiration date after determining that the user is eligible, and wherein the user is informed of the temporary card verification value and the temporary card expiration date.

16. The method of claim 15, further comprising assigning a replacement card verification value and a replacement card expiration date for the payment card.

17. The method of claim 11, wherein a merchant server provides the online application for a financial credit account with a financial institution.

18. The method of claim 11, wherein said user details are received through an online application interface.

19. The method of claim 18, wherein the online application interface comprises data defining user input screens for display by a computing device.

20. A method for secure transmission of an identifier via a plurality of distinct communications channels, the method comprising:
requesting, by a mobile device from a remote computer system via a first communication channel, Internet content uniquely associated with the mobile device;
receiving, by the mobile device from the remote computer system via the first communication channel responsive to the request, the Internet content comprising a first portion of an identifier uniquely associated with a user of the mobile device;
receiving, by the mobile device from the remote computer system via a second communication channel different from the first communication channel, a second portion of the identifier uniquely associated with the user of the mobile device, the second portion transmitted by the remote computer system responsive to the request for the Internet content transmitted via the first communication channel;
concatenating the first portion and the second portion to recover the identifier uniquely associated with the user of the mobile device; and
transmitting, by the mobile device to a second remote computer system, the identifier, the second remote computer system authorizing a transaction responsive to receipt of the identifier.

* * * * *